(12) United States Patent
Mueller et al.

(10) Patent No.: US 8,698,378 B2
(45) Date of Patent: Apr. 15, 2014

(54) ULTRASONIC TRANSDUCER FOR USE IN A FLUID MEDIUM

(75) Inventors: Roland Mueller, Steinheim (DE); Gerhard Hueftle, Aspach (DE); Michael Horstbrink, Stuttgart-Feuerbach (DE); Tobias Lang, Stuttgart (DE); Sami Radwan, Stuttgart (DE); Bernd Kuenzl, Schwieberdingen (DE); Roland Wanja, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 12/998,980

(22) PCT Filed: Nov. 26, 2009

(86) PCT No.: PCT/EP2009/065894
§ 371 (c)(1),
(2), (4) Date: Sep. 12, 2011

(87) PCT Pub. No.: WO2010/072506
PCT Pub. Date: Jul. 1, 2010

(65) Prior Publication Data
US 2012/0038248 A1 Feb. 16, 2012

(30) Foreign Application Priority Data
Dec. 23, 2008 (DE) .......................... 10 2008 055 123

(51) Int. Cl.
*H01L 41/08* (2006.01)
(52) U.S. Cl.
USPC ........................................................ 310/346
(58) Field of Classification Search
USPC ......................................... 310/326, 327, 346
See application file for complete search history.

(56) References Cited

U.S. PATENT DOCUMENTS

| | | | | |
|---|---|---|---|---|
| 5,038,069 | A | * | 8/1991 | Lukasiewicz et al. ......... 310/338 |
| 5,654,604 | A | * | 8/1997 | Ashizawa et al. ......... 310/323.03 |
| 6,798,121 | B2 | * | 9/2004 | Nakatani et al. .............. 310/340 |
| 6,948,864 | B2 | * | 9/2005 | Reilly et al. ..................... 385/92 |
| 7,345,410 | B2 | * | 3/2008 | Grannen et al. ............... 310/364 |
| 7,408,286 | B1 | * | 8/2008 | Bhattacharjee et al. ...... 310/346 |
| 8,004,163 | B2 | * | 8/2011 | Shibata et al. ................ 310/358 |
| 2003/0189241 | A1 | * | 10/2003 | Kamada et al. ............... 257/632 |
| 2005/0000279 | A1 | | 1/2005 | Yogeswaren |
| 2005/0061076 | A1 | | 3/2005 | Kim |
| 2005/0236710 | A1 | * | 10/2005 | Akiyama et al. .............. 257/744 |
| 2008/0238262 | A1 | | 10/2008 | Takeuchi et al. |
| 2008/0238263 | A1 | * | 10/2008 | Nihei ............................ 310/346 |

FOREIGN PATENT DOCUMENTS

| | | |
|---|---|---|
| DE | 100 55 893 | 5/2002 |
| DE | 103 44 741 | 4/2005 |
| DE | 10 2007 010 500 | 9/2008 |
| DE | 10 2007 028 352 | 12/2008 |
| DE | 10 2008 027 974 | 12/2008 |

(Continued)

*Primary Examiner* — Thomas Dougherty
(74) *Attorney, Agent, or Firm* — Kenyon & Kenyon LLP (57) ABSTRACT

An ultrasonic transducer for use in a fluid medium includes at least one piezoelectric transducer element, at least one matching body for the promotion of a vibrational coupling between the piezoelectric transducer element and the fluid medium, and at least one compensating body situated between the piezoelectric transducer element and the matching body for the reduction of thermal stresses, the compensating body having a coefficient of thermal expansion that is between a coefficient of thermal expansion of the piezoelectric transducer element and a coefficient of thermal expansion of the matching body.

11 Claims, 3 Drawing Sheets

(56) References Cited

FOREIGN PATENT DOCUMENTS

| | | |
|---|---|---|
| DE | 10 2007 037 088 | 2/2009 |
| DE | 10 2007 060 989 | 6/2009 |
| EP | 0 974 814 | 1/2000 |
| EP | 0974814 A1 * | 1/2000 |
| EP | 1 238 388 | 9/2002 |
| EP | 1 329 875 | 7/2003 |
| JP | 61-53899 | 3/1986 |
| JP | 1-190098 A * | 7/1989 |
| JP | 3006861 | 11/1994 |
| JP | 2001-190098 | 7/2001 |
| JP | 2002-112393 | 4/2002 |
| JP | 2002-325299 | 11/2002 |

* cited by examiner

ULTRASONIC TRANSDUCER FOR USE IN A FLUID MEDIUM

BACKGROUND OF THE INVENTION

1. Field of the Invention

The present invention relates to ultrasonic transducer for use in a fluid medium.

2. Description of Related Art

The present invention is based on known ultrasonic transducers that can be used for example in ultrasonic flow meters in process technology or in the automotive field, in particular in the intake and/or exhaust section of internal combustion engines, for volume flow or mass flow measurement. In this context, typically ultrasonic transducers are used that are capable both of emitting ultrasonic waves into a fluid medium (a gas and/or a liquid) and also receiving ultrasonic waves. Standardly, ultrasonic signals are transmitted through the flowing fluid medium from a transmitter to a receiver, and the runtime, runtime differences, or phases of the ultrasonic signals, or also combinations of these measurement quantities, are measured during this transmission. These signals are influenced by the flow of the fluid medium. From the degree of influencing of the runtime, it is possible to infer the flow speed of the fluid medium. An example of such an ultrasonic transducer that can be used for example in ultrasonic flow meters is presented in published German patent application document DE 10 2007 010 500 A1. The designs presented there can also be modified for use within the scope of the present invention. Using such ultrasonic transducers, for example air quantity signals can be derived within a system controlling of an internal combustion engine.

In standard ultrasonic transducers, as a rule piezoelectric transducer elements are used; however, such transducer elements have an acoustic impedance that differs greatly, for example by a factor of $6\times10^5$, from that of the surrounding fluid medium. Due to this large impedance difference, as a rule 99.9995% of the sonic energy on the path from the piezoelectric transducer element into the fluid medium is reflected back at the corresponding boundary surface, and cannot be used for the measurement. The same reflection loss occurs again at the second, receiving piezoelectric transducer element, which can also be identical to the first transducer element. In order to improve the acoustic coupling between the piezoelectric transducer element and the fluid medium, measures for impedance matching are standardly used. For example, from the prior art, e.g. from published German patent application document DE 10 2007 010 500 A1, ultrasonic transducers are known in which one or more matching bodies, in particular matching layers, for impedance matching are situated between the piezoelectric transducer element and the fluid medium. These matching bodies have acoustic impedances between that of the piezoelectric transducer element and that of the fluid medium. Thus, for example membranes or $\lambda/4$ layers onto which the (usually thin) piezoelement is glued can be used for impedance matching.

In known ultrasonic transducers, the connection between the matching body and the piezoelectric transducer element presents a particular technical challenge. In particular in the area of the connection, temperature shocks can cause damages that are due to different coefficients of thermal expansion (CTE). These coefficients indicate the relative change in length per change in temperature, in ppm/K or $10^{-6}$/K. For example, the coefficient of thermal expansion of many matching bodies is typically greater than 30 ppm/K, whereas most plastics and adhesives have a much higher coefficient of thermal expansion. In contrast, typical piezoceramics are in the range of 7 ppm/K. At the same time, however, piezoceramics generally react with extreme sensitivity to mechanical stresses, in particular tensile stresses and/or shear stresses, by forming microcracks or undergoing depolarization. Such stresses occur due to a rather slow relaxation of tension, in particular when there are rapid temperature shocks. Such a mechanical aging of the piezoceramics is usually significantly exacerbated by purely thermal or purely electrical loads that may be present.

In order to protect the piezoelectric transducer elements in the case of temperature shocks, for example flexibilized adhesives may be used. Such flexibilized adhesives, i.e. adhesives that are sufficiently flexible in themselves or are made sufficiently flexible by adding corresponding additives and/or filler materials, can compensate the above-described stresses due to different expansion of the matching bodies and of the piezoceramics. In this way, a sufficient stability under temperature shock of the ultrasonic transducers can be guaranteed. However, as a rule such flexibilized adhesives become so flexible at higher temperatures that they are no longer able to provide an adequate acoustic coupling between the piezoelectric transducer element and the matching body. Less flexible adhesives, in contrast, result in a larger usable temperature range of the ultrasonic transducer, but make the transducer more sensitive to temperature shocks. Thus, with regard to the coupling between the matching body and the piezoelectric transducer element there is a conflict between the goal of good acoustic coupling over a wide temperature range and the goal of high stability against temperature shocks.

BRIEF SUMMARY OF THE INVENTION

In order to solve the described problem, an ultrasonic transducer for use in a fluid medium is proposed. In general, here an ultrasonic transducer is understood to be an element that is capable of converting electrical signals into ultrasonic signals and/or vice versa. In particular, the proposed ultrasonic transducer, as described above, can be used in an ultrasonic flow meter, in particular in automotive applications, in order to measure a speed, a mass flow, a volume flow, a flow rate, or other flow-related mechanical quantities of a fluid medium, in particular of a gas, in particular air. However, other areas of application are also possible in principle.

The proposed ultrasonic transducer has at least one piezoelectric transducer element and at least one matching body, in particular at least one matching layer, in order to promote a vibrational coupling between the piezoelectric transducer element and the fluid medium. Here, the term "piezoelectric transducer element" is to be understood broadly, including for example electro-acoustic transducers that operate according to ferroelectric, electrostatic, magnetostrictive, or magnetoelectric effects, or combinations thereof. As stated above, the matching body is used to improve the coupling between the ultrasonic transducer and the fluid medium. Thus, the matching body should have at least one material having an impedance that is between the impedance of the piezoelectric transducer element, for example a piezoceramic thereof, and the impedance of the fluid medium, e.g. air. With regard to the selection of materials for this at least one matching body, e.g. an at least one matching layer, and with regard to the further design of this matching body, e.g. the matching layer, reference may be made for example to published German patent application document DE 10 2007 010 500 A1 (cited above) and the materials described there.

In order to resolve the above-described conflict of goals, it is proposed that at least one compensating body for reducing thermal stresses be situated between the piezoelectric transducer element and the matching body. This compensating body can also be constructed for example in the form of at least one intermediate layer, and/or can include such an intermediate layer.

Here it is proposed that the compensating body be formed such that the coefficient of thermal expansion $CTE_{Zwischen}$ of the compensating body is between the coefficient of thermal expansion $CTE_{Piezo}$ of the piezoelectric transducer element and the coefficient of thermal expansion $CTE_{Anpass}$ of the matching body. Here, the compensating body can in principle also have a plurality of elements (for example layers) having different coefficients of thermal expansion. A continuous or a discontinuous change of the coefficients of thermal expansion across the compensating body is also conceivable, for example in the form of a gradient of the coefficients of thermal expansion. In the case in which a plurality of coefficients of thermal expansion are present in the compensating body, the named condition should hold for at least one of the coefficients of thermal expansion, and preferably for all of them. Alternatively or in addition, the named condition may also hold for example for a mean value of the coefficients of thermal expansion and/or for the maximum and/or minimum coefficient of thermal expansion present in the compensating body. Preferably, coefficient of thermal expansion $CTE_{Zwischen}$ is closer, in particular significantly closer, to the coefficient of thermal expansion of the piezoelectric transducer element than it is to coefficient of thermal expansion $CTE_{Anpass}$ of the matching body. In other words, it is proposed that, preferably, the difference between coefficient of thermal expansion $CTE_{Zwischen}$ of the compensating body and coefficient of thermal expansion $CTE_{Piezo}$ of the piezoelectric transducer element be smaller (i.e., that its magnitude be smaller) than the difference between coefficient of thermal expansion $CTE_{Anpass}$ of the matching body and coefficient of thermal expansion $CTE_{Zwischen}$ of the compensating body.

The compensating body is here formed such that it has at least one homogenous and/or macroscopically at least largely isotropic material, in particular a material mixture. Here, "has" is intended also to subsume the case in which the compensating body contains other substances in addition to the material, as well as the case in which the compensating body is made up completely of such a material. By "a homogenous or macroscopically at least largely isotropic material" is meant a material that stands in contrast for example to a macroscopically oriented material such as a fiber material. Here, in at least one dimension, preferably in two or even three dimensions, at least at a scale of more than 200 μm, in particular more than 100 μm, there should essentially be no recognizable inhomogeneities or anisotropies, for example orientations, and this should preferably hold at a smaller scale, e.g. a scale of less than 50 μm. Individual undesired and statistically occurring inhomogeneities, such as cavities and/or contaminants, can be disregarded here.

Because standard piezoceramics have coefficients of thermal expansion of, typically, less than 10 ppm/K, e.g. in the range of 7 ppm/K, it is particularly preferable if the coefficient of thermal expansion $CTE_{Zwischen}$ of the compensating body is chosen to be in a range less than 20 ppm/K, preferably in a range less than 15 ppm/K. The matching body can for example have a coefficient of thermal expansion of more than 20 ppm/K, in particular more than 30 ppm/K. The insertion of the compensating body between the matching body and the piezoelectric transducer element also ensures a greater degree of freedom with regard to the materials that can be used for the matching body.

In addition, in contrast for example to fiber materials, the compensating body can also have a greater layer thickness than that of standardly used layers. Thus, the compensating body can for example have a layer thickness, i.e. a dimension in an axis of connection between the piezoelectric transducer element and the matching body, that is at least 0.5 mm. In particular given the use of cylindrical piezoelements, for example having a diameter of 8 mm and a height of 2 mm, greater layer thicknesses are preferable, for example thicknesses of at least 1.0 mm and, particularly preferably, of at least 1.5 mm or more.

The compensating body can in particular contain a material mixture. Here, a material mixture is understood to be a material that has at least two components that are not chemically bonded to one another. The material mixture can in particular include at least one matrix material and at least one filler material. The matrix material can for example have a material that is hardenable and/or hardened by a cross-linking process, in particular an epoxy resin. The cross-linking process can for example be initiated chemically and/or thermally and/or photochemically; thermal cross-linking processes are preferred. Alternatively or in addition to epoxy resins, other such cross-linkable materials may be used, but epoxy resins are preferable due to their low coefficients of thermal expansion. Such epoxy resins are used for example in microelectronics, circuit board manufacturing, manufacturing of chip housings, and the like. The epoxy resin can also have the flexibility required to ensure a compensation of the above-described stresses between the piezoelectric transducer element and the matching body.

The filler material can be used for the further reduction of the coefficients of thermal expansion. Thus, for example standard filler materials can be used that reduce the coefficients of thermal expansion of the material mixture, such as quartzes, in particular quartz flour and/or silicates and/or ceramic materials and/or fiber materials, for example carbon fiber materials. For example, degrees of filling between 70 and 95 mass percent can be used, in particular between 80 and 90 mass percent, for example 83 mass percent.

The compensating body can be manufactured in various ways. Corresponding methods for manufacturing an ultrasonic transducer are also proposed according to the present invention. Thus, the compensating body can for example be produced entirely or partially by a casting method. Here, various casting methods may be used, including in combination. Thus, for example an injection-molding method and/or a transfer molding method and/or a sheet molding method and/or a dead-mold casting method may be used. Alternatively or in addition, however, other methods may be used, such as sintering methods. The compensating body can be produced immediately in or on the ultrasonic transducer and/or in or on a preliminary assembly of the ultrasonic transducer, for example using one or more of the named methods, for example being produced already in a housing of the ultrasonic transducer and/or in a dead mold that remains in the ultrasonic transducer. In this way, shaping can take place with a simultaneous material bond to other components of the ultrasonic transducer. Here the shaping can be achieved entirely or partially by the other components and/or also entirely or partially by a separate tool. Alternatively or in addition, the compensating body can also be produced entirely or partially as a separate component, for example as one or more separate shaped parts. With regard to the details of dead-mold casting methods that may be used, reference is made for example to the above-described published German patent application document DE 10 2007 010 500 A1.

In particular in connection with casting methods, but also other manufacturing methods, it is preferable if the ultrasonic transducer has at least one fixing element that is set up to fix a relative position between the piezoelectric transducer element and the matching body. Thus, for example spacer elements, centering elements, locking hooks, or similar elements may be used, including in combination.

As described above, the compensating body can for example be produced by a casting method. A casting method is understood as a method in which an initial material, of the compensating body, for example a preliminary material of the compensating body that is still capable of being shaped, for example castable, is shaped using corresponding shaping methods. Simultaneously with or subsequent to the shaping, transformation into the compensating body can then take place, for example by hardening a hardenable material. Alternatively or in addition, the compensating body can also include at least one shaped part, in particular a disc. The shaped part can be placed into the ultrasonic transducer, for example into a housing of the ultrasonic transducer, for example as a separate component. The shaped part can of course also be manufactured by a casting method and/or also by other methods.

The optional shaped part can be connected to the piezoelectric transducer element and/or to the matching body, in particular by a material connection. In particular, here a gluing may be used, the shaped part being glued to the piezoelectric transducer element and/or to the matching body by an adhesive preferably having a coefficient of thermal expansion $CTE_{Kleb}$ that is between coefficient of thermal expansion $CTE_{Piezo}$ of the piezoelectric transducer element and coefficient of thermal expansion $CTE_{Anpass}$ of the matching body. An intermediate gradation may also be used. Thus, for example $CTE_{Kleb}$, e.g. for a glued connection between the matching body and the compensating body, can be between $CTE_{Anpass}$ and $CTE_{Zwischen}$. Alternatively or in addition, $CTE_{Kleb}$ for a glued connection between the compensating body and the piezoelectric transducer can be between $CTE_{Zwischen}$ and $CTE_{Piezo}$. Preferably, for one or more of the named adhesive connections, an adhesive is used that is at least partially identical with a material of the compensating body. For example, again a filled epoxy can be used to produce this material bond. Other constructions in which different adhesives are used are also possible.

The optional shaped part can be manufactured in various ways. Thus, the shaped part can for example include a plastic material, in particular a shaped part in the form of an epoxy resin disc. Alternatively or in addition, the shaped part can however also be manufactured entirely or partially of a non-plastic material, for example in the form of a shaped part made of glass and/or in the form of a shaped part made of a ceramic. Combinations of different materials are also possible. The matching body can in principle be formed as a disc, a layer, or in some other way. With regard to possible embodiments of the shape of the matching body, reference is made again for example to published German patent application document DE 10 2007 010 500 A1. Thus, the compensating body can also at least partially enclose the matching body, and optionally can also at least partially enclose the piezoelectric transducer element. In this case in particular, it is particularly preferable if this matching body is simultaneously used as the mold of a casting method for producing a compensating body.

The ultrasonic transducer proposed above and corresponding methods for manufacturing such an ultrasonic transducer have a large number of advantages compared to known ultrasonic transducers and known methods. The matching of the coefficients of thermal expansion via the compensating body brings it about either that there occurs, at least to a large extent, no thermally induced mechanical stress between the piezoelectric transducer element and the material directly adjacent, in this case the compensating body, or else that the stress is much less than that between the compensating body and the immediately adjoining matching body. Thus, the sensitive piezoelectric transducer element is protected from damage, such as formation of microcracks and/or depolarization, which would often occur as a result of temperature shocks if the compensating body were not present. In addition, due to the homogeneity characteristic of the compensating body, this compensating body can be made relatively thick compared to non-homogenous materials such as fiber meshes. This means that the larger portion, or the entire CTE mismatch, can be positioned spatially far away from the piezoelectric transducer element, so that lower stresses also occur in the area of the piezoelectric transducer element.

In addition, the selection of a homogenous compensating body, instead of for example a fibroid intermediate layer, can remove the difficulty of positioning a fiber mat directly on the piezoelectric transducer element and holding it there until hardening takes place. Moreover, when fibers are installed, their stability generally depends, in a sensitive manner, on the fabric structure and the weave. If, in contrast, filler materials are used to ensure the required CTE, and these materials are mixed at least largely homogenously into the compensating body, these sensitive influencing quantities are then no longer present, and the filler materials are necessarily present directly at or sufficiently close to the piezoelectric transducer element. The difficulty of ensuring the required coefficients of thermal expansion immediately at the piezoelectric transducer element is thus shifted from a possibly difficult fiber positioning to a preferably at least extremely high degree of filling of the compensating body, for example of an epoxy compound of the compensating body. The latter however preferably takes place at a preliminary panel stage of manufacture, so that a manufacturing advantage can be realized here in large-scale manufacturing.

Furthermore, the compensating body can also improve the connection between the matching body and the piezoelectric transducer element in other ways. For example, the matching body can be made at least partially porous. This porosity can however make a direct gluing between the matching body and the piezoelectric transducer element more difficult or unstable, in that the adhesive can for example seep into the pores. This can also change the acoustic properties of the matching body. In the proposed use of the at least one compensating body, in particular using one or more of the above-described manufacturing methods, for example the casting method, injection-molding method, or transfer mold method, this difficulty can be avoided. Thus, for example the porous surfaces of the matching body can be sealed by the material of the compensating body in these manufacturing methods.

DETAILED DESCRIPTION OF THE INVENTION

Figure 1:
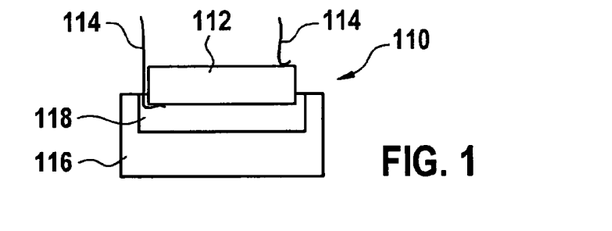
FIG. 1 shows an exemplary embodiment of an ultrasonic transducer according to the present invention having a compensating body.

FIG. 1 shows a first exemplary embodiment of an ultrasonic transducer 110 according to the present invention in a sectional view from the side. Ultrasonic transducer 110 has a piezoelectric transducer element 112 that can be formed for example as a cylindrical piezoelement. This piezoelectric transducer element 112 can for example be electrically contacted via two terminal contacts 114, for example contact wires, so that piezoelectric transducer element 112 can for example be provided with control signals via these terminal contacts 114, and/or so that signals of the piezoelectric transducer element 112 can be led away via terminal contacts 114.

In addition, in the embodiment shown in FIG. 1 ultrasonic transducer 110 has a matching body 116. This matching body 116 is used to improve the vibrational coupling between piezoelectric transducer element 112 and a fluid medium into which ultrasonic signals are to be coupled and/or from which ultrasonic signals are to be coupled into piezoelectric transducer element 112. Matching body 116 is thus situated between piezoelectric transducer element 112 and the fluid medium (not shown in FIG. 1). Matching body 116 thus acts to improve the acoustic coupling in the ultrasonic signal range. Preferably, this matching body 116 enables an impedance matching. Examples of the design of such a matching body 116 can be found in the above-described prior art, in particular for example published German patent application document DE 10 2007 010 500 A1, in which possible geometries and materials of matching body 116 are shown that can also be transferred to the present invention. Matching body 116 is for example formed as a layer, but can also be used as a dead mold, as shown in FIG. 1 and described in more detail below, and can for example at least partially enclose a compensating body 118 accommodated between matching body 116 and piezoelectric transducer element 112.

The at least one compensating body 118 between matching body 116 and piezoelectric transducer element 112 contributes to the solution of the above-described conflict of goals in the connection between piezoelectric transducer element 112 and matching body 116. On the one hand, this coupling has to guarantee sufficient stability against temperature shocks, so that in principle very soft couplings between matching body 116 and piezoelectric transducer element 112 would be preferred.

On the other hand, such soft couplings however generally become so flexible at high temperatures that they are no longer capable of providing an adequate acoustic coupling between piezoelectric transducer element 112 and matching body 116. Less flexible couplings, in contrast, do provide larger usable temperature ranges of ultrasonic transducer 110, but increase its sensitivity to temperature shocks.

Figure 2A:
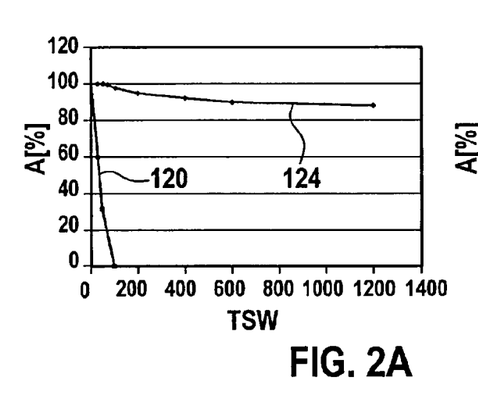
FIGS. 2A and 2B show resistances to temperature shock and temperature ranges for conventional ultrasonic transducers having inflexible and flexibilized epoxy adhesives.
Figure 2B:
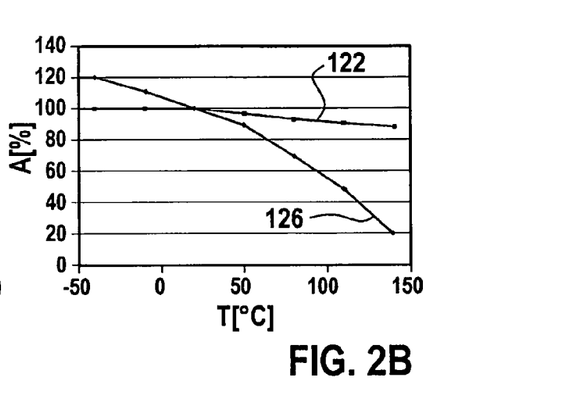

This conflict of goals is shown in FIGS. 2A and 2B, in which measurements are shown that were carried out on conventionally constructed ultrasonic transducers 110 not having compensating body 118 according to the present invention. FIG. 2A shows an ultrasonic amplitude, plotted in percent of the first measurement, as a function of a number of temperature shock cycles (designated TSW in FIG. 2A). This measurement therefore characterizes the temperature shock stability of ultrasonic transducer 110. In contrast, in FIG. 2B the ultrasonic amplitude is again plotted in percent, but in this case as a function of temperature of use T in ° C. This measurement thus shows the usable temperature range of ultrasonic transducers 110.

Here, various types of ultrasonic transducers 110 were used, having different couplings between piezoelectric transducer element 112 and matching body 116. Curves 120, 122 show measurements of an ultrasonic transducer 110 in which piezoelectric transducer element 112 was connected to matching body 116 via a hard, inflexible epoxy adhesive. In contrast, measurements 124, 126 show measurements of an ultrasonic transducer 110 in which a flexibilized epoxy adhesive was used for the connection between piezoelectric transducer element 112 and matching body 116.

The measurement results provide a good illustration of the above-described conflict of goals. As FIG. 2A shows, with regard to temperature shock stability ultrasonic transducers 110 having flexibilized epoxy adhesives are advantageous, because the flexibilized epoxy adhesives are capable of providing good compensation of thermal stresses between matching body 116 and piezoelectric transducer element 112. In contrast, the use of inflexible epoxy adhesives (curve 120) in ultrasonic transducers 110 results in the destruction of ultrasonic transducers 110 after only a few temperature shocks. On the other hand, the measurements in FIG. 2B clearly show that ultrasonic transducers 110 having flexibilized epoxy adhesives (curve 126) have a significantly smaller usable temperature range compared to ultrasonic transducers having inflexible epoxy adhesives (curve 122). Thus, characteristic properties of such ultrasonic transducers 110 are strongly dependent on the respective temperature use range, which can fluctuate greatly in automotive applications in particular.

Figure 3A:
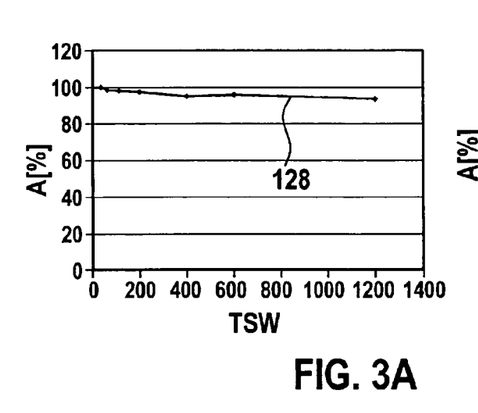
FIGS. 3A and 3B show resistances to temperature shock and temperature range of an ultrasonic transducer according to the present invention having a compensating body.
Figure 3B:
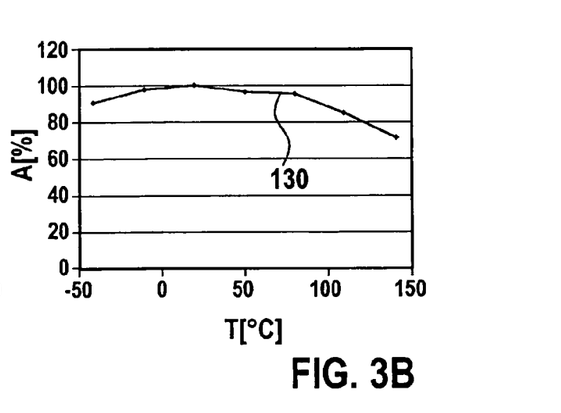

In contrast, FIGS. 3A and 3B show measurements 128, 130 (represented analogously to FIGS. 2A and 2B), carried out for an ultrasonic transducer 110, e.g. according to FIG. 1. In this ultrasonic transducer 110 according to the present invention, a compensating body 118 is situated between piezoelectric transducer element 112 and matching body 116, resolving the above-described conflict of goals. From measurement 128 according to FIG. 3A, which again shows the temperature shock stability, it can be seen that the temperature shock stability of an ultrasonic transducer 110 according to the present invention is actually improved in comparison with measurement 124 in FIG. 2A with the flexibilized epoxy adhesive between piezoelectric transducer element 112 and matching body 116. Measurement curve 130 according to FIG. 3B shows that despite this improvement in the temperature shock stability, there is a significantly improved (compared to measurement curve 126 in FIG. 2B) uniformity of the measurement signal across the temperature range. These measurements clearly show the advantages of ultrasonic transducers 110 according to the present invention having compensating bodies 118, in comparison with conventional ultrasonic transducers 110 in which the piezoelectric transducer elements 112 are glued directly to matching bodies 116.

In laboratory trials, compensating bodies 118 based on filled epoxies were used to produce ultrasonic transducers 110 having compensating bodies 118. In this context, filled epoxies having coefficients of thermal expansion $CTE_{Zwischen}$ of less than 12 ppm/K turned out to be particularly advantageous. In piezoelectric transducer elements 112 having a diameter of approximately 8 mm and a height of approximately 2 mm, layer thicknesses of more than 1.5 mm turned out to be advantageous. For matching bodies 116, materials were used having a coefficient of thermal expansion $CTE_{Anpass}$ of greater than 30 ppm/K. Overall, therefore, at least when filled epoxies are used it is advantageous if large layer thicknesses are used for compensating body 118, with coefficients of thermal expansion that are significantly closer to that of piezoelectric transducer element 112 than to that of matching body 116. If other materials are used for compensating body 118, such as particular types of ceramic and/or glass, the advantageous ranges may shift.

The material for compensating body 118, which can be formed in particular as an intermediate layer, can in particular be highly filled epoxy resins. The filling can for example be quartz flour and/or ceramic material. For example, glob-top compounds known from electrical engineering and/or stable wall materials used in electronic encapsulation technology to limit underfillers may be used as materials for compensating body 118, as long as these materials have comparatively low coefficients of thermal expansion. Such materials, known from other areas of electrical engineering, typically have a low coefficient of thermal expansion in order to mechanically protect, for example, sensitive silicon chips or contactings without producing additional thermal stresses. However, a side effect of the high degree of filling is the high acoustic impedance, which fits well with the piezoelectric transducer element 112 that is used. The high modulus of elasticity of the named materials in turn enables a significantly better acoustic coupling between piezoelectric transducer element 112 and matching body 116 than is possible for example with the use of flexibilized plastics normally used in ultrasonic transducers 110 in order to protect against thermal stresses. Ultrasonic transducers 110 having compensating bodies 118 of the type described between piezoelectric transducer element 112 and matching body 116 may be formed and manufactured in various ways, as is to be explained on the basis of FIGS. 4A through 6C, alternatively or in addition to the design according to FIG. 1.

The exemplary embodiments according to FIGS. 4A through 4E show ultrasonic transducers 110 each having a matching body 116 and a compensating body 118 situated between matching body 116 and piezoelectric transducer element 112. In addition, in all the exemplary embodiments ultrasonic transducers 110 also optionally have at least one attenuating element 132 that is set up to ensure the fastest possible decay of acoustic signals. In this way, it can for example be ensured that acoustic signals sent out by piezoelectric transducer element 112 are made comparatively short, so that overlapping of successive signals can be avoided. Such attenuating elements 132 can for example include plastics. Here, for example silicones and/or epoxies and/or polyurethanes can be used, which can be processed for example by casting and which have attenuating characteristics. In particular, here as well composite materials can be used, for example composite materials made up of at least one matrix material, in particular an elastomer matrix material, and/or a thermosetting plastic matrix material, and at least one filler material. Thermoplastic matrix materials are however also possible in principle. Gas enclosures, for example gas bubbles, may also be used as filler material, for example by using plastic foams. Alternatively, or in addition, for example solid enclosures, for example plastic hollow balls, may also be used as filler material or as a component of the filler material, for example gas-filled hollow balls. Alternatively or in addition, heavier filler materials may also be used. FIGS. 4A through 4E show that different systems and/or constructions of attenuating elements 132 are possible. Thus, these attenuating elements 132 may also be used, entirely or partially, as molds, for example dead molds as described in published German patent application document DE 10 2007 010 500 A1, for the manufacture of further elements of ultrasonic transducer 110. For example, these attenuating elements 132 may be used, entirely or partially, as dead molds for the manufacture of matching body 116 and/or of compensating body 118. Thus, in the exemplary embodiment shown in FIG. 4A, attenuating element 132 encloses at its end face, i.e. at the radiating side facing the fluid medium, matching body 116 as well as, radially, matching body 116 and compensating body 118. In the exemplary embodiment shown in FIG. 4B, attenuating element 132 additionally at least partially encloses piezoelectric transducer element 112. In the exemplary embodiment shown in FIG. 4E, attenuating element 132 encloses, at least partially, piezoelectric transducer element 112, for example toward a cover (not shown in FIG. 4E) of an optional housing of ultrasonic transducer 110. With regard to the enclosure of compensating body 118 and of matching body 116, the exemplary embodiment shown in FIG. 4C corresponds largely to the exemplary embodiment shown in FIG. 4A. In the exemplary embodiment shown in FIG. 4D, only matching body 116 is partially enclosed by attenuating element 132.

Figure 4A:
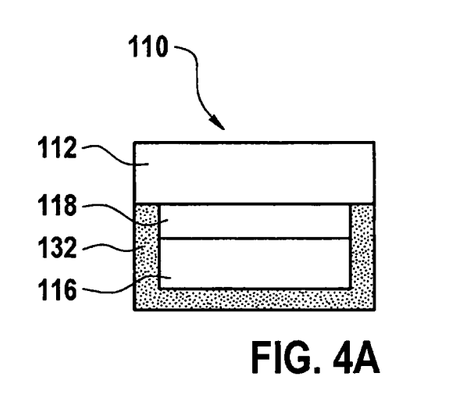
FIGS. 4A through 4E show various exemplary embodiments of ultrasonic transducers according to the present invention.
Figure 4B:
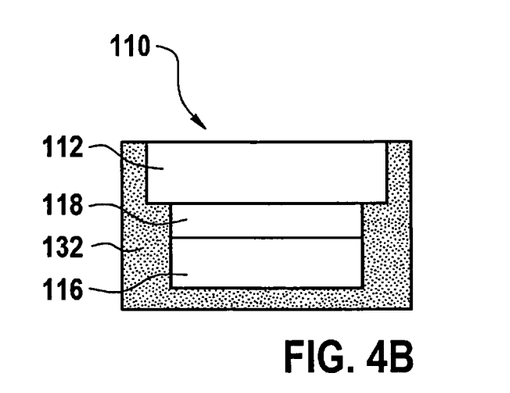
Figure 4C:
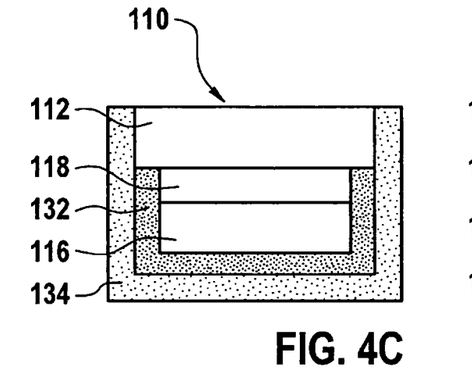
Figure 4D:
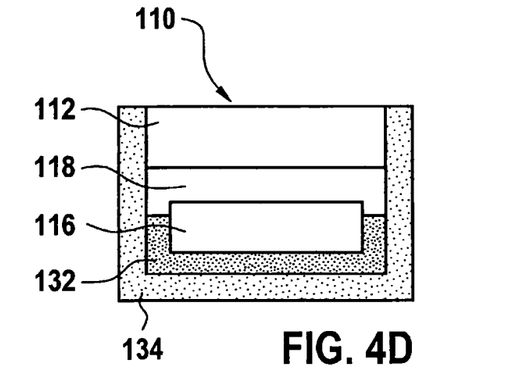
Figure 4E:
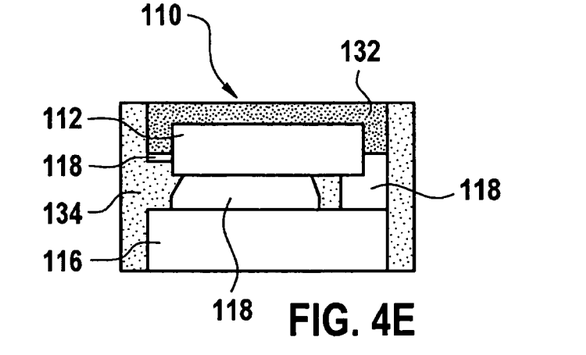

In the exemplary embodiments according to FIGS. 4C through 4E, in addition to an attenuating element 132 at least one optional decoupling element 134 is also provided. This optional decoupling element 134, which can also be provided in the exemplary embodiments according to FIGS. 4A and 4B, provides a decoupling of structure-borne sound between piezoelectric transducer element 112 and/or matching body 116 and/or compensating body 118 and an optional housing of ultrasonic transducer 110 (not shown in the Figures). For example, such decoupling elements 134, which can also entirely or partially be combined with attenuating element 132, can be produced from a very soft material.

In order to ensure the decoupling, decoupling element 132 can for example contain an elastomer material, in particular a silicone material and/or a polyurethane. For example, liquid silicone can be used (liquid silicone rubber, or LSR). In general, decoupling element 132 can contain at least one plastic material, in particular an elastomer material having a Shore-A hardness of, preferably, less than 40, in particular less than 25. In particular, composite materials can also be used, in particular composite materials made up of at least one matrix material, in particular an elastomer matrix material, and at least one filler material. Gas enclosures, for example gas bubbles, may possibly be used here as filler material, for example by using elastomer films. Alternatively or in addition, it is also possible for example to use solid enclosures, such as plastic hollow balls, as a filler material or as a component of the filler material, e.g. gas-filled hollow balls.

In the exemplary embodiment according to FIG. 4C, decoupling element 134 radially encloses attenuating element 132 at the end face, as well as enclosing matching body 116, compensating body 118, and piezoelectric transducer element 112. A similar design is also shown in FIG. 4D. In the exemplary embodiment according to FIG. 4E, in contrast, only a radial enclosure by decoupling element 134 is provided, as well as an at least partial embedding of coupling element 134 in the layer plane of compensating body 118. As shown above, in the exemplary embodiments according to FIGS. 4A through 4E attenuating element 132 and/or decoupling element 134 can be used as a dead mold for a direct casting in order to produce ultrasonic transducer 110. The variant embodiment already described above of ultrasonic transducer 110 according to FIG. 1 can also be manufactured by direct casting, for example using filled epoxy resin as compensating body 118. As described above, for example a contoured matching body 116 is used, which can also be used as a dead mole. Here, in addition a fixing can be carried out of piezoelectric transducer element 112 during the connecting, e.g. casting, for example through a protruding part of matching body 116, an additional concomitantly cast fixing element, and/or an external fixing device. This is not shown in FIG. 1.

Figure 5A:
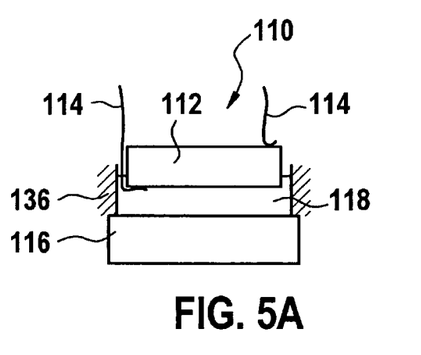
FIGS. 5A through 5D show examples of various methods for manufacturing ultrasonic transducers according to the present invention.
Figure 5B:
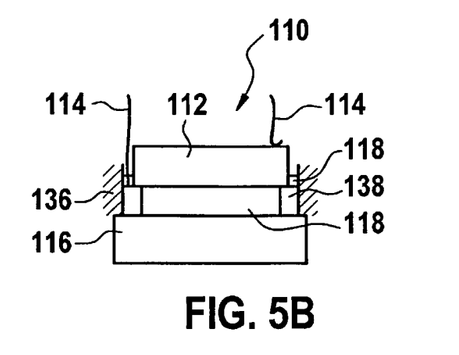
Figure 5C:
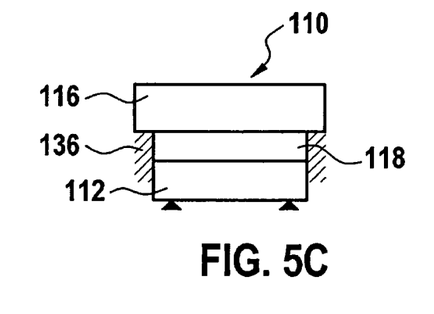
Figure 5D:
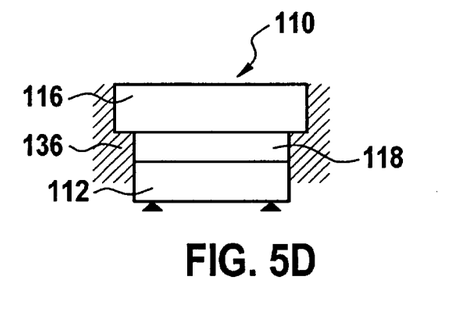

Alternatively or in addition to the use of a direct casting with a dead mold, a direct casting can also be used to create the connection between compensating body 118 and piezoelectric transducer element 112 and/or matching body 116, also using an external mold 136, as shown in various specific embodiments FIGS. 5A through 5D. Here, FIGS. 5A and 5B show variant embodiments in which the casting takes place on matching body 116, whereas FIGS. 5C and 5D show "inverse" variant designs in which piezoelectric transducer element 112 is first put into place and then compensating body 118 and matching body 116 are put into place thereon by direct casting. In addition, as indicated in FIG. 5B, at least one fixing element 138 can also optionally be situated in mold 136, for example in the form of lamellae for support and/or positioning.

Figure 6A:
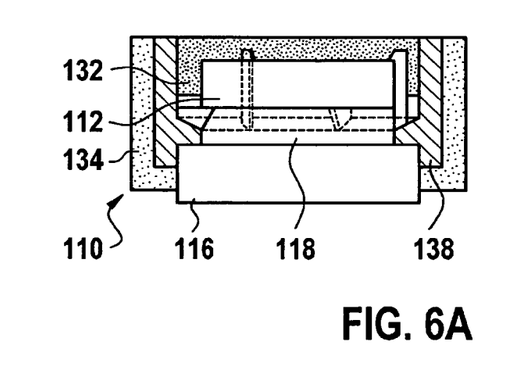
FIGS. 6A through 6C show an exemplary embodiment of the manufacture of an ultrasonic transducer having a fixing element.
Figure 6B:
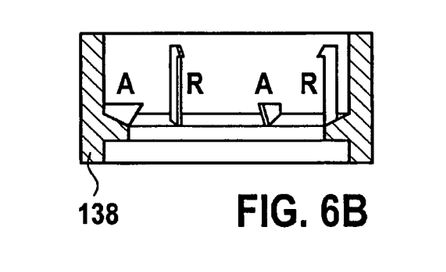
Figure 6C:
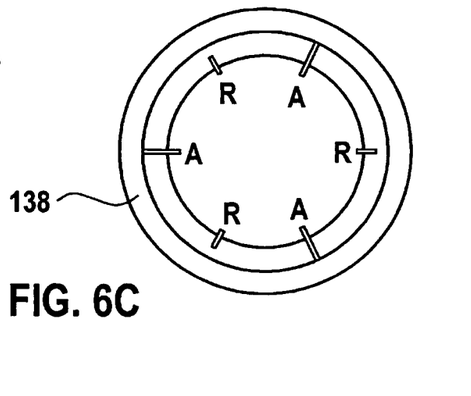

FIGS. 6A through 6C again show a variant design in which a fixing element 138 is put into place that can remain in ultrasonic transducer 110 as a dead mold. FIG. 6A shows a cross-section through an ultrasonic transducer 110 constructed according to the present invention, whereas FIG. 6B shows only fixing element 138 in a cross-sectional view, and FIG. 6C shows a top view of fixing element 138. It can be seen that fixing element 138, which for example can be formed as a plastic shaped part not having an undercut, includes integrated fixing aids. In FIGS. 6B and 6A, the letter A designates support surfaces for piezoelectric transducer element 112, while the letter R designates guide and locking hooks that may optionally be provided and that can additionally fix piezoelectric transducer element 112. Fixing element 138 according to FIGS. 6B and 6C can be used for the installation of ultrasonic transducer 110, for example on matching body 116. Subsequently, attachment of piezoelectric transducer element 112 and casting with compensating body 118 can take place. Fixing element 138, for example as a separate plastic shaped part, can thus be used in direct casting, e.g. with filled epoxy resin, for the manufacture of compensating body 118, simultaneously as dead mold and as fixing aid. Here, the fixing contours can be realized with thin walls in such a way that the material properties of fixing element 138 are essentially not important. Thus, for example materials having high coefficients of thermal expansion may be used without being capable of causing noticeable stress on piezoelectric transducer element 112. Again, in the exemplary embodiment shown in FIG. 6A, in addition at least one attenuating element 132 and at least one decoupling element 134 can be provided. Here, the design of attenuating element 132 and of decoupling element 134 corresponds essentially to the design shown in FIG. 4E, so that reference is made to the description above.

The direct casting for the production of compensating body 118, for example through filled epoxy resin and/or the use of a dead mold according to one of the specific embodiments shown in FIGS. 1, 4A through 4E, 5A through 5D, or 6A through 6C, provides simplifications and advantages from the point of view of manufacturing. The dead mold can also be part of matching body 116, as shown for example in the exemplary embodiment according to FIG. 1. Alternatively or in addition, a separate component, possibly also identical with the dead mold, can also be used for the fixing during the manufacturing process, as indicated in the form of fixing element 138 shown in the examples in FIGS. 6A through 6C. The dead mold can also be at least partially identical with an attenuating element 132 and/or a decoupling element 134, as indicated in FIGS. 4A through 4E.

In the latter case as well, the dead mold can for example itself be fashioned as a positioning and/or fixing aid, as shown for example in FIG. 4E. Alternatively or in addition, however, a separate positioning and fixing part may also be used. Given a piezoelectric transducer element 112 whose vibration is primarily radial, attenuating element 132 preferably at least also lies on the cylinder circumference of piezoelectric transducer element 112. Attenuating element 132 brings it about that piezoelectric transducer element 112 quickly decays after a brief pulsed excitation, which is advantageous for ultrasonic runtime measurements. A decoupling element 134 forms the mechanical interface, or a part of such a mechanical interface, of ultrasonic transducer 110 to the outside, and can prevent ultrasonic energy from penetrating, not only into the fluid medium, but also as structure-borne sound into the mechanical environment surrounding ultrasonic transducer 110, which can cause interference signals. A dead mold need not be used only for the casting of compensating body 118, but can for example also be used to cast matching body 116, for example a matching body having a filling with glass hollow balls, for example in an epoxy resin matrix. In this case, a separate previous manufacture of matching body 116 can be omitted; rather, this matching body 116 can also be produced directly in ultrasonic transducer 110. One advantage of a direct casting is a more economical and more easily manageable process. In addition, an electrical contacting of piezoelectric transducer element 112 can be simplified without requiring for example a more expensive electrode geometry.

The above exemplary embodiments all show a design of ultrasonic transducer 110 achieved through direct casting. All of the depicted ultrasonic transducers 110 can however optionally and alternatively also be produced by other techniques, for example by producing separate shaped parts that are subsequently joined in a corresponding manner. Thus, for example semi-finished parts can be produced, for example made of filled epoxy resins, and compensating bodies 118 can be produced from these by corresponding processing. In addition, compensating bodies 118 can also be produced immediately from the initial materials, for example, again, filled epoxy resins. Compensating bodies 118 produced in this way can then be glued to piezoelectric transducer element 112 and/or to the matching body, for example using the same filled epoxy resin.

Compensating body 118 can also be manufactured in larger forms and then brought into the desired form through corresponding processing. Thus, for example casting in rod form can take place, for example casting of a filled epoxy resin. A semi-finished part manufactured in this way can then for example be sawed into discs that can then in turn be used as compensating body 118 and/or can be used in such a compensating body 118. Alternatively or in addition, an initial material, for example a filled epoxy resin compound, can also be brought directly into a disc shape, for example using a corresponding mold. For example, a perforated plate can be used as a mold that is filled with the filled epoxy resin compound or with the initial material. Subsequently, a doctor knife can be drawn over this plate in order to produce a smooth surface. The perforated plate can then be pressed onto a base plate as a termination in order to facilitate demolding after hardening. The mold can for example have a Teflon coating and/or be made of Teflon or of a material coated in some other way, in order to further facilitate demolding. The hardened discs, for example the epoxy resin disks, can then be placed as insert parts into an adhesive connection between matching body 116 and piezoelectric transducer element 112. Here, the adhesive should likewise have a suitable coefficient of thermal expansion, preferably a coefficient of thermal expansion that is at least largely identical with that of the material of compensating body 118. Ideally, the material of the adhesive can be at least largely identical with the material of compensating element 118, for example the disc material. The thickness of compensating body 118, for example the intermediate layer, can then result in a very reproducible fashion from the disc thickness and the pressure during the gluing process. One advantage among others here, compared to the above-described method of direct casting, is that a thickness of compensating body 118 can be set more easily and in a more reproducible fashion, and that no mold or dead mold is required at the component itself.

In laboratory trials, manufacturing was carried out using both method variants, i.e. the above-described direct casting and a method including a separate compensating body 118. The latter was accomplished using an intermediate step, via a cast and sawed rod. A filled epoxy resin of type R1007 of the company Nagase was used, having a coefficient of thermal expansion of 10 ppm/K. At thicknesses beginning at about 1.5 mm, the conflict of goals described above on the basis of FIGS. 2A through 3B, using both manufacturing methods, was successfully counteracted using ultrasonic transducers 110 according to the present invention, and a large temperature range with simultaneously stable behavior against temperature shocks was achieved. The temperature shock stability vanishes, at least with the use of similar materials of the same manufacturer, with increasing coefficients of thermal expansion. Thus, in laboratory trials it was determined that piezoelectric transducer element 112 was damaged by temperature shocks already at a coefficient of thermal expansion of 17 ppm/K of the material of compensating body 118.

In general, the use of filled epoxy resins for compensating body 118 is a preferred variant of the construction according to the present invention of this compensating body 118. However, alternatively or in addition in principle other materials can be used having suitable coefficients of thermal expansion. Thus, for example it is possible to use other materials such as glasses and/or ceramics, whether in direct casting and/or using a manufacturing method with a separate component for compensating body 118. Here as well, for example again separate components can be produced that can then be glued between matching body 116 and piezoelectric transducer element 112, for example using a filled epoxy resin glue, for example having the above-described properties. Here as well, the thickness of compensating body 118 is easy to set, and no mold or dead mold is required at the component itself. Such molds or dead molds can however in principle be used alternatively or in addition. Moreover, in this method variant difficulties connected with demolding, such as a strongly adhesive epoxy resin compound, do not arise during the production of a semi-finished part or disc.

Other manufacturing methods are also conceivable for the manufacture of compensating body 118, alternatively or in addition to the above-described direct casting and/or the use of a separate component. Thus, compensating body 118 can for example be produced entirely or partially using an injection-molding or transfer mold technology, and can be attached in this way to matching body 116. This injection-molding or transfer mold process can for example be carried out analogous to the packaging of a silicon chip. An advantage of such a process controlling is its increased tolerance compensation. If, for example, for the matching of the impedance a matching body 116 is used whose geometric tolerances are too large for subsequent manufacturing processes, these tolerances can be compensated by the smaller, tool-bound tolerances based on the molding process for the coupling assembly, including matching body 116 and compensating body 118. This holds in particular when matching body 116 is mechanically processed down from a semi-finished part, or if this element is manufactured in a stamping and/or pressing tool with a predefined pressure force and coarse tolerated filling quantity or granulate consistency.

There are also numerous possibilities relating to the manufacture of matching body 116. Thus, matching body 116 can for example contain a material provided with hollow spaces, e.g. a porous ceramic material, a foamed plastic, in particular a thermosetting plastic and/or thermoplastic, generally a polymer, or a plastic provided with hollow bodies. Possible hollow bodies here include plastic or glass hollow bodies, preferably glass hollow balls. In general, reference is made for example to published German patent application document DE 10 2007 010 500 A1 with regard to possible materials for matching body 116 that may alternatively or additionally be used in the context of the present invention. If a plastic is used as base material or matrix material for matching body 116, then for example an epoxy resin material filled with glass hollow balls can be used. Alternatively or in addition, for example a polyimide may be used, for example a foamed, sintered, or porous polyimide; an example is the polyimide of the type Vespel® made by Dupont.

What is claimed is:

1. An ultrasonic transducer for use in a fluid medium, comprising:
   at least one piezoelectric transducer element;
   at least one matching body configured to provide a vibrational coupling between the piezoelectric transducer element and the fluid medium; and
   at least one compensating body configured to provided reduction of thermal stress and situated between the piezoelectric transducer element and the matching body, wherein the compensating body has a coefficient of thermal expansion which is between a coefficient of thermal expansion of the piezoelectric transducer element and a coefficient of thermal expansion of the matching body, wherein the compensating body has at least one of a homogenous material and macroscopically isotropic material mixture, wherein the difference between the coefficient of thermal expansion of the compensating body and the coefficient of thermal expansion of the piezoelectric transducer element is smaller than the difference between the coefficient of thermal expansion of the matching body and the coefficient of thermal expansion of the compensating body, wherein the compensating body has a material mixture including at least one matrix material and at least one filler material, and wherein the matching body is used to improve the coupling between the piezoelectric transducer element and the fluid medium.

2. The ultrasonic transducer as recited in claim 1, wherein the compensating body has a coefficient of thermal expansion which is less than 20 ppm/K.

3. The ultrasonic transducer as recited in claim 1, wherein the matching body has a coefficient of thermal expansion greater than 20 ppm/K.

4. The ultrasonic transducer as recited in claim 1, wherein the compensating body has a layer thickness of at least 1.5 mm.

5. The ultrasonic transducer as recited in claim 1, wherein the matrix material includes at least one of a hardenable material and a material hardened through a cross-linking process.

6. The ultrasonic transducer as recited in claim 1, wherein the filler material includes at least one of a quartz, a ceramic material, a silicate, and a carbon fiber material.

7. The ultrasonic transducer as recited in claim 1, further comprising:
at least one fixing element for fixing a relative position between the piezoelectric transducer element and at least one of the matching body and the compensating body.

8. The ultrasonic transducer as recited in claim 1, wherein the compensating body includes at least one disc part connected to at least one of the piezoelectric transducer element and the matching body by gluing using an adhesive having a coefficient of thermal expansion which is between the coefficient of thermal expansion of the piezoelectric transducer element and the coefficient of thermal expansion of the matching body.

9. The ultrasonic transducer as recited in claim 8, wherein the disc part includes at least one of a plastic material, an epoxy resin, a glass and a ceramic.

10. The ultrasonic transducer as recited in claim 1, wherein the matching body at least partially encloses the compensating body.

11. A method for manufacturing an ultrasonic transducer for use in a fluid medium, comprising:
providing at least one piezoelectric transducer element;
providing at least one matching body configured to provide a vibrational coupling between the piezoelectric transducer element and the fluid medium; and
providing at least one compensating body configured to provided reduction of thermal stress and situated between the piezoelectric transducer element and the matching body, wherein the compensating body has a coefficient of thermal expansion which is between a coefficient of thermal expansion of the piezoelectric transducer element and a coefficient of thermal expansion of the matching body, and wherein the compensating body has at least one of a homogenous material and macroscopically isotropic material mixture;
wherein the compensating body is produced at least partially by a casting method including at least one of an injection-molding method, a transfer molding method, a direct casting method and a casting method using a dead mold, wherein the difference between the coefficient of thermal expansion of the compensating body and the coefficient of thermal expansion of the piezoelectric transducer element is smaller than the difference between the coefficient of thermal expansion of the matching body and the coefficient of thermal expansion of the compensating body, wherein the compensating body has a material mixture including at least one matrix material and at least one filler material, and wherein the matching body is used to improve the coupling between the piezoelectric transducer element and the fluid medium.

* * * * *

UNITED STATES PATENT AND TRADEMARK OFFICE
CERTIFICATE OF CORRECTION

PATENT NO.       : 8,698,378 B2
APPLICATION NO.  : 12/998980
DATED            : April 15, 2014
INVENTOR(S)      : Mueller et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 186 days.

Signed and Sealed this
Twenty-ninth Day of September, 2015

Michelle K. Lee
*Director of the United States Patent and Trademark Office*